June 16, 1942.  J. H. ABRAMSON ET AL  2,286,781
CABLE PULLING DEVICE
Filed Sept. 18, 1939

Inventors:
John Herbert Abramson
Edwin C. Swanson
By McCanna, Wintercorn & Morsbach
Attys.

Patented June 16, 1942

2,286,781

UNITED STATES PATENT OFFICE 2,286,781

CABLE PULLING DEVICE

John Herbert Abramson and Edwin C. Swanson, Rockford, Ill., assignors to Greenlee Bros. & Co., Rockford, Ill., a corporation of Illinois Application September 18, 1939, Serial No. 295,358

7 Claims. (Cl. 175—376)

This invention relates to cable pulling devices, and has special reference to a mechanism designed primarily for the purpose of pulling electrical cable wires and the like through conduit or pipe, as, for example, in the electrical wiring of buildings, though obviously suitable for other analogous uses.

As is well known in the art, considerable difficulty is encountered in the wiring of large buildings, in pulling the electrical conductors, cables and the like, through long spans of conduit which frequently are curved and in which the conduit may pass through a number of boxes and outlet fittings. In the past this has been done most commonly by the use of block and tackle or the like, but such means has often acted to damage not only the cable but frequently the conduit structure as well. Furthermore, it is required the use of cumbersome equipment which has been difficult to set and has required an excessive amount of labor in its use. In our copending application, Serial No. 156,679, we disclose a cable puller which constitutes a major improvement in this art and the present application describes and claims an improvement over and addition to the structure of said application.

An important object of the invention is the provision of an improved connection between the winch and conduit.

Another object of the invention is the provision of improved means, in a cable puller, for guiding the cable between the conduit and the winch.

A still further object of the invention is the provision of a cable puller wherein sufficient cable can be pulled from the conduit to make the usual connections.

A still further object is the provision of connector means for fastening the cable guiding means to the conduit.

A still further object is the provision of an improved connection of flexible nature which permits of placing the winch at a convenient location.

Other objects and advantages will be apparent from the following description and the accompanying drawing, in which—

Figure 1:
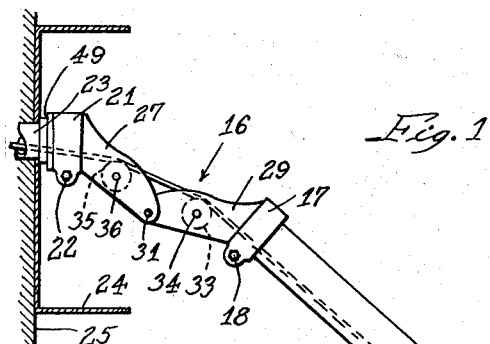
Figure 2:
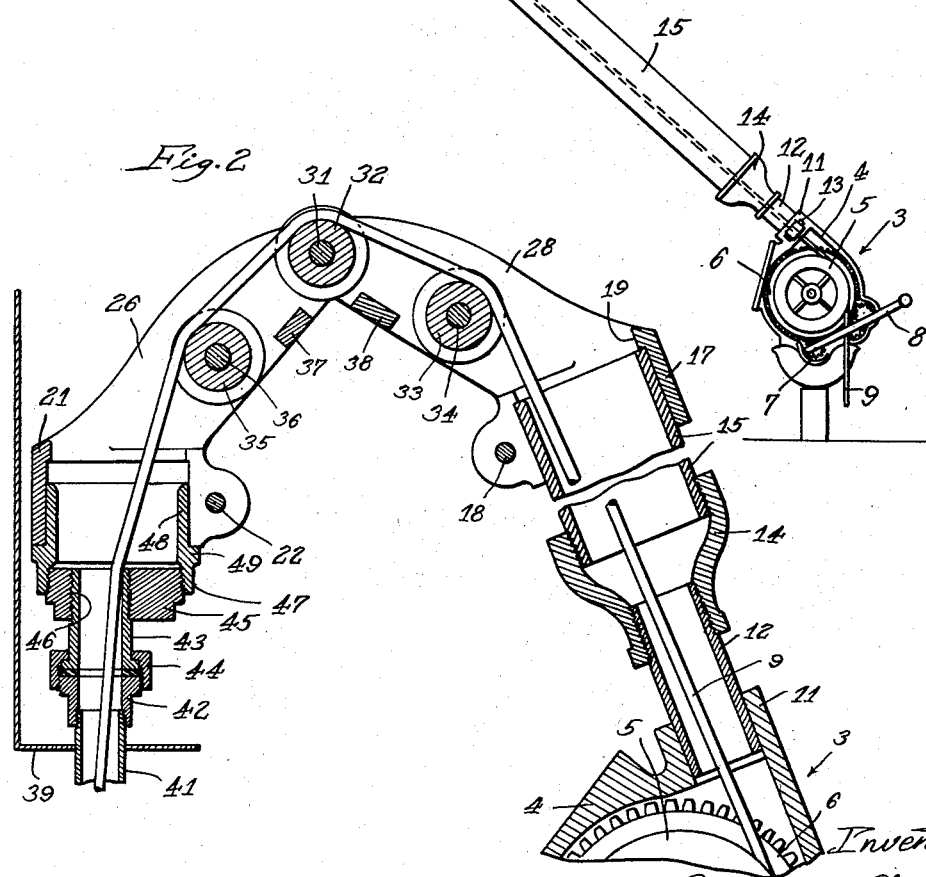

Figure 1 is an elevational view showing the invention as used in pulling cable from conduit located at an elevated point, and Fig. 2 is a section taken longitudinally through the device showing the manner in which it is employed on relatively small conduit positioned close to the walls of a conventional electrical outlet box.

The invention contemplates generally the provision of a pulling device for pulling cable through a conduit or pipe, and relates primarily to the manner of applying the pulling force and to the solution of problems relating thereto, particularly that of withdrawing sufficient cable beyond the end of the conduit to allow for further connections and to the attachment of the pulling device to the conduit so as to permit the pulling mechanism to operate in conventional cabinets and in angular directions.

A preferred embodiment of the invention is shown in Figs. 1 and 2, and includes a winch 3 similar in all essential particulars to that shown in our above-mentioned copending application, and which includes a frame 4, a capstan or cathead 5 driven by a gear 6 and spur gear 7 by means of a rotatable handle 8, a pulling line 9 being wound through a plurality of turns on the cathead 5, the free end of the line being unwound from the cathead as the cable is pulled. As used in Figure 1, the frame 4 has a split collar 11 adapted to receive a pipe nipple 12, which advantageously may be a piece of conduit, in this instance, a "2" conduit, a bolt 13 serving to tighten the collar on the nipple. A fitting 14, in this instance a reversing coupling, is threaded onto the nipple 12 and in turn receives a pipe 15, the length of which will depend upon the nature of the location in which the pulling operation is to be conducted. The fitting 14 should be of such size as to take a pipe equal to or greater than the diameter of the largest conduit with which the operator is apt to work, and in this way the device is made adaptable or suitable for attachment to a wide variety of sizes of conduit. We have found that in most cases a 4" conduit is satisfactory. The fitting 14 is preferably also such that the pipe 15 may be of standard size, such, for example, as a 2", 3" or other standard size pipe, readily available so that on the job a suitable length of pipe may be selected. The opposite end of the pipe 15 carries an elbow-like fitting designated generally by the numeral 16, and while strictly speaking this fitting is not an elbow, we have used this term for convenience in description. This elbow is articulated between its ends so that it may be used in any position from one in which the axis thereof is a straight line to one in which the axis curves through 180° or better. The elbow has a split sleeve 17 adapted to be tightened by means of a bolt or screw 18 through which means the elbow is attached to the end of the pipe 15 and fixedly secured thereto. Preferably the sleeve has a shoulder as shown at 19 (Fig. 2) to limit the degree of insertion of the pipe. The opposite end of the elbow has a split sleeve 21 likewise tightened by means of a bolt or screw 22 so as to slightly change the diameter of the sleeve and thereby cause the same to grip the end 23 of a conduit projecting into the interior of a conventional junction box or other appliance designated generally by the numeral 24 attached to a wall 25. Interchangeable guide sleeves and reducers such as that subsequently described at 45 and 47 may be employed between the sleeve 21 and the conduit 23 to act as a reducer so as to rigidly attach the sleeve 21 to different sizes of conduit. In this instance the opening in the reducer 45 may, of course, be concentrically positioned.

The elbow 16 is shown in cross-section in Fig. 2 and includes the collars 17 and 21. Formed on the collar 21 are ears 26 and 27 which extend outward in a somewhat axial direction from the collar 21 and are parallelly disposed. The ears curve outwardly away from the axis of the collar so that the outer ends of the ears are offset from the plane of the collar. The collar 17 likewise has ears 28 and 29 substantially similar to the ears 26 and 27. The ends of the ears 28 and 29 are received between the ends of the ears 26 and 27 and are pivotally attached thereto by means of a pivot pin 31 so that the collars 21 and 17 are attached together thereby and are supported for rotation thereon with respect to each other. A roller 32 is also rotatably carried on the pin 31 between the ears 28 and 29, while a roller 33 is rotatably carried on a pin 34 between these ears, the roller being spaced between the roller 32 and the collar 17. The ears 26 and 27 also carry a roller 35 rotatable on a pin 36. The rollers 33 and 35 are positioned, it will be seen, on the inner side of the ears, that is, on the arc of the elbow of smaller radius. The ears 26 and 27 have complementary abutments 37 thereon so as to limit the approach movement of the arms and to lend strength thereto, while the ears 28 and 29 likewise have abutments 38 for the same purpose.

During the pulling operations with the parts in the position shown in Figure 1, it will be seen that the pulling line 9 rests against the rollers 35 and 33 which guide and support the line in its angular movement from the conduit 23, thereby preventing the line or the cable which follows the line, from bearing against the sharp end of the conduit as it passes therethrough.

In Fig. 2 we have shown the manner in which the line and cable are drawn out of the box and through an angle approaching 180°, necessitated by a different type of box and a different position thereof, such as is frequently encountered in practice. In this instance the box 39 is so arranged that the conduit 41 enters the bottom of the box and extends into the box in relatively close relationship to the wall. It will be seen that in this type of location it would normally be necessary to support the winch at an elevated position, thereby necessitating the building of scaffolding or other means for supporting the winch. Even in such cases the cable would be drawn sharply around the open end of the conduit. For the purpose of pulling the cable under such circumstances, a part 42 of a conventional pipe union is threaded onto the end of the conduit 41 and attached thereto is the complementary portion 43 and threaded ring 44 of the union. Threaded onto the end of the union is a nut or reducer 45, the threaded internal opening 46 of the reducer being placed eccentrically therein as shown in Fig. 2. If desired, a separate fitting may be made for this purpose, incorporating the parts 45, 44 and 43, though the use of the standard parts will be found cheaper and equally satisfactory. Threaded onto the reducer 45 is a sleeve 47 which projects upwardly as shown at 48 for the reception of the collar 21, the sleeve having a shoulder 49 for limiting the position of the collar thereon. It will be seen that in this way the relatively large collar 21 of the elbow may be employed for pulling from the relatively small conduit 41 which could not otherwise be accomplished since the box does not permit of space for otherwise attaching the elbow. However, by this arrangement the sleeve 47, collar 21, reducer 45 and coupling portion 43 can be assembled outside the box and fastened to the coupling portion 42 by rotation of the nut 44 in the usual way.

The manifold advantages of our invention will be apparent to those skilled in the art, in that it provides a unitary mechanism by which cable may be pulled under substantially all circumstances, and eliminates the necessity on the part of the workman for rigging up separate and independent devices for each type of pulling operation. This is accomplished in our invention through the manner in which the elbow is constructed and by the manner in which the elbow is connected to the conduit. On the other hand, with the type of job shown in Figure 1, it is unnecessary to use all of the features of the invention, but the arrangement is such that the winch and heavier parts of the device need not be brought to an elevated point, thereby materially saving in labor. Attention is also directed to the fact that the device functions to transmit the pulling force between the conduit and the cable. In other words, the force applied to the cable is transmitted in the form of a counterforce back to the conduit, which is the object offering resistance to the movement of the cable. This eliminates the difficulties heretofore associated with the pulling of conduit, namely, the tendency of the pulling operations to loosen the conduit from its moorings or to damage associated electrical equipment such as junction boxes, outlet boxes, and the like. A further advantage of the construction is that the pipe 15 offers space into which the end of the cable may be drawn so that the required amount of excess cable may be drawn out of the conduit to provide for wiring operations within the junction box or other accessory. This is a result which has been difficult to accomplish with prior art pulling devices, and is an important characteristic of the device from a practical standpoint.

We claim:

1. The combination in a device for pulling cable from conduit of a metal elbow comprising two elbow portions pivotally connected near their ends for free relative angular movement, means on the free ends of each portion for connection to a pipe, and a plurality of rollers spaced longitudinally of the elbow for transporting a cable therethrough along a relatively wide arc.

2. The combination in a cable puller of an elbow comprising two split sleeves, each having an ear positioned on each side of the split portion of the sleeve, means pivotally connecting the ears of the sleeves to form an elbow-like structure, means for adjusting the diameter of the sleeves to clamp the same to a pipe, a plurality of rollers on the inner side of the curve formed by the elbow, means for pivotally supporting the rollers on opposed ears for adjustment of the diameter of said sleeves, and a plurality of said members for limiting the approach of said ears.

3. The combination in a device for pulling cable from conduit, of an adjustable elbow, a union member eccentrically positioned on one end of said elbow and a union member secured to the end of said conduit for attachment to the first mentioned union member for attachment of the elbow to the end of a conduit terminating in close proximity to a laterally disposed construction.

4. The combination in a cable puller for pulling cable from conduit extending into a box comprising a flexible elbow of substantially greater diameter than said conduit, a fitting secured to the end of said conduit having an opening registering with said conduit and an outer surface eccentric with respect to the opening for reception of one end of said elbow, and means on the other end of said elbow for attachment of a winch.

5. The combination in a cable puller for pulling cable from conduit extending into a box comprising a flexible elbow of substantially greater diameter than said conduit, a fitting secured to the end of said conduit having an opening registering with said conduit and an outer surface eccentric with respect to the opening for reception of one end of said elbow, means on the other end of said elbow for attachment of a winch, and a plurality of rollers spaced longitudinally of said elbow for guiding the pulling line and the cable through the elbow.

6. The combination in a portable cable puller for use in drawing cable and the like through conduit, of an elbow shaped for attachment to a conduit, said elbow having a single pivotal axis, a winch for drawing cable through said conduit and elbow, and a rigid pipe connecting said winch and said elbow to carry the winch thereon at a remote point and to transmit the counterforce of the cable pulling operations to the conduit through said elbow, and guide means in said elbow comprising a plurality of rollers spaced longitudinally of the elbow for maintaining a relatively wide curvature on the cable passing therethrough.

7. A portable cable puller unit of the character described comprising in combination a winch of appreciable mass representing a large fraction of the total weight of the unit and adapted to rest on the floor or other support in the operation of the unit and adapted to be controlled by the workman, the unit as a whole being light enough for workmen to carry from place to place for various cable pulling operations, a rigid elongated pipe rigid with and extending from said winch adapted to serve as a guide for pulling line extending from and wound on the winch and as a guide ultimately for the end portion of a cable attached to the pulling line and pulled out of a conduit by means of said line, a metal elbow comprising two elbow sections pivotally connected on a substantially horizontal transverse axis intermediate the ends of said elbow, means on the free end of one elbow section for rigidly mounting the same on the end of the aforesaid pipe remote from the winch, means on the free end of the other elbow section for detachably securing the same in end thrust transmitting abutment with the end of a conduit, the winch resting by gravity on the floor or other support under the weight of the winch and pipe at an angle to the conduit when the elbow at the other end of the pipe is attached to said conduit in or on an adjacent wall whereby to withstand the end thrust incident to pulling the cable, said pipe and elbow being substantially rigid longitudinally so as not to collapse under said end thrust, said elbow transmitting the end thrust to the end of the conduit, and anti-friction guide means in said elbow for the pulling line and cable to maintain that portion thereof between the pipe and conduit on an arc of appreciable radius so as not to damage the same in pulling.

JOHN HERBERT ABRAMSON.
EDWIN C. SWANSON.

CERTIFICATE OF CORRECTION.

Patent No. 2,286,781. June 16, 1942.

JOHN HERBERT ABRAMSON, ET AL.

It is hereby certified that error appears in the printed specification of the above numbered patent requiring correction as follows: Page 5, first column, line 3, claim 2, for the word "said" second occurrence, read --stop--; and that the said Letters Patent should be read with this correction therein that the same may conform to the record of the case in the Patent Office.

Signed and sealed this 18th day of August, A. D. 1942.

Henry Van Arsdale,
Acting Commissioner of Patents.

(Seal)